United States Patent [19]

Morris

[11] 4,079,947
[45] Mar. 21, 1978

[54] LIQUID SEALING DEVICE

[75] Inventor: Alberto Jorge Morris, Dursley, England

[73] Assignee: R. A. Lister & Company Limited, England

[21] Appl. No.: 737,527

[22] Filed: Nov. 2, 1976

[51] Int. Cl.² .................... F16J 15/40; F16J 15/54
[52] U.S. Cl. .................................. 277/13; 277/25; 277/96.2; 277/133
[58] Field of Search ............... 277/133, 25, 96, 96.2, 277/13, 14, 134, 136

[56] References Cited

U.S. PATENT DOCUMENTS

| 2,347,953 | 5/1944 | Katcher | 277/96 |
| 2,571,352 | 10/1951 | Fast | 277/134 |
| 2,699,345 | 1/1955 | Bales | 277/136 |
| 3,055,666 | 9/1962 | Moreno | 277/133 |
| 3,468,548 | 9/1969 | Webb | 277/13 |
| 3,608,910 | 9/1971 | Tyler | 277/25 |
| 3,778,070 | 12/1973 | Shimura | 277/134 |
| 3,791,657 | 2/1974 | Bilski | 277/133 |

Primary Examiner—Robert I. Smith
Attorney, Agent, or Firm—Schuyler, Birch, Swindler, McKie & Beckett

[57] ABSTRACT

A liquid sealing device, for inhibiting passage of liquid between a rotatably mounted shaft and an aperture through which the shaft extends with working clearance, including an annular shoulder projecting from the shaft, means adjacent the shaft formed with a cylindrical bore in which the shoulder is rotatable with working clearance, a helical groove extending around the periphery of the annular shoulder, and closure means for the bore adjacent one end of said annular shoulder, said closure means defining said aperture through which the shaft extends with working clearance, whereby rotation of the shaft in a given direction will cause the helical groove to resist the passage of liquid between the annular shoulder and the bore, and will enable the annular shoulder and closure means to co-operate and thereby inhibit passage through the clearance between the shaft and the aperture of any residual liquid which overcomes the resistance of the helical groove.

21 Claims, 5 Drawing Figures

LIQUID SEALING DEVICE

The invention relates to a liquid sealing device for inhibiting passage of liquid between a rotatably mounted shaft and an aperture through which the shaft extends. The invention is particularly, but not exclusively, concerned with a sealing device which will inhibit the passage of fluid such as lubricant from the inside of an engine to the outside at a point where a rotary shaft passes through a wall of the engine.

Hitherto, it has been proposed to utilise a helical groove in a shaft and/or in the wall of a bore in which the shaft is rotatably mounted to inhibit the passage of liquid between the shaft and the wall of the bore during rotation of the shaft. Unfortunately, the seal produced by such an arrangement is often inconsistent, and failures are quite common. In order to produce an effective seal, the groove has to be of considerable length, and a precision assembly is required in order to keep the running clearance between the shaft and the bore very small and to ensure concentricity. Whilst it may be possible to provide such a precision assembly on certain types of machinery, it is not possible to do so in cases where the shaft bearings require large running clearances. Where shaft bearings are of the sleeve type, and where shaft deflection is likely to be considerable, the running clearance required in the bearings is generally too large to enable the known type of helical groove sealing means to operate satisfactorily. As object of the invention is to provide an improved liquid sealing device of the helical groove type in which at least some of the disadvantages of known helical groove seals are mitigated.

According to the invention, a liquid sealing device for inhibiting passage of liquid between a rotatably mounted shaft and an aperture through which the shaft extends with working clearance includes an annular shoulder projecting from the shaft, means adjacent the shaft formed with a cylindrical bore in which the shoulder is rotatable with working chearance, a helical groove extending around the periphery of the annular shoulder, and closure means for the bore adjacent one end of said annular shoulder, said closure means for the bore adjacent one end of said annular shoulder, said closure means defining said aperture through which the shaft extends with working clearance, whereby rotation of the shaft in a given direction will cause the helical groove to resist the passage of liquid between the annular shoulder and the bore, and will enable the annular shoulder and closure means to co-operate and thereby inhibit passage through the clearance between the shaft and the aperture of any residual liquid which overcomes the resistance of the helical groove.

Preferably, the helical groove is formed in the periphery of the annular shoulder.

A sealing element is preferably located between the annular shoulder and the closure means, the sealing element being restrained against rotation relatively to said means adjacent the shaft. The sealing element may be restrained against rotation by means of projections on said closure means. The projections may be in the form of a plurality of radially disposed ribs arranged on an annular inner surface of the closure means engageable with the sealing element. Alternatively, or additionally, the projections may be in the form of a plurality of circumferentially spaced ribs arranged on a cylindrical inner surface of the closure means engageable with the sealing element. Preferably, the ribs are of substantially square cross-section. Instead of using projections to restrain the sealing element against rotation, the sealing element may be restrained by bonding it to the closure means. The sealing element may be in the form of a felt ring.

The closure means may be a cup-like element having an cylindrical peripheral wall and an annular end surface, the end of the peripheral wall remote from the annular end surface being spaced from the annular shoulder.

The dimensions of the closure means and bore are preferably chosen so that the closure means will be a tight fit in the bore.

Preferably, the helical groove extends for one turn or between one and two turns around the periphery of the annular shoulder.

The annular shoulder may be formed by a ring-like member fitted to the shaft.

Preferably, the said means adjacent the shaft in which the bore is formed comprises support means for the shaft.

A liquid sealing device in accordance with the invention will now be described by way of example with reference to the accompanying drawings in which.

Figure 1:
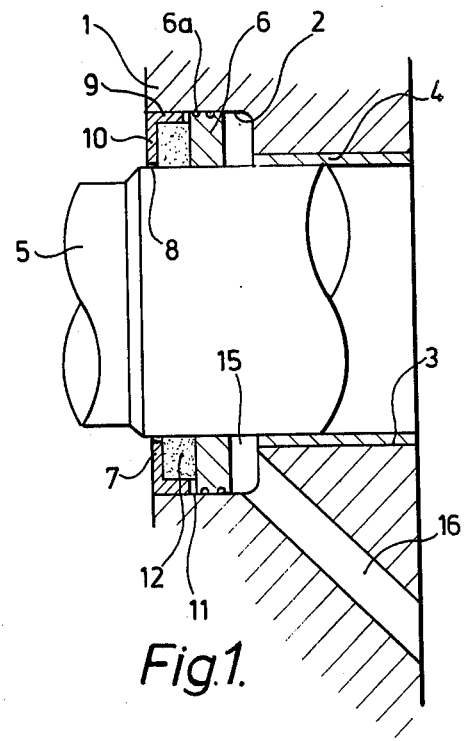
FIG. 1 is a longitudinal cross-section through a housing for an engine or other machine showing a shaft extending through the sealing device.
Figure 2:
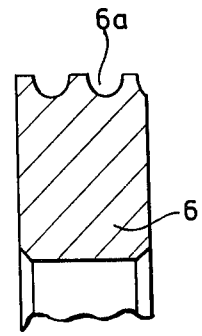
FIG. 2 is a cross-sectional view of part of a ring forming the annular shoulder drawn to a larger scale.
Figure 3:
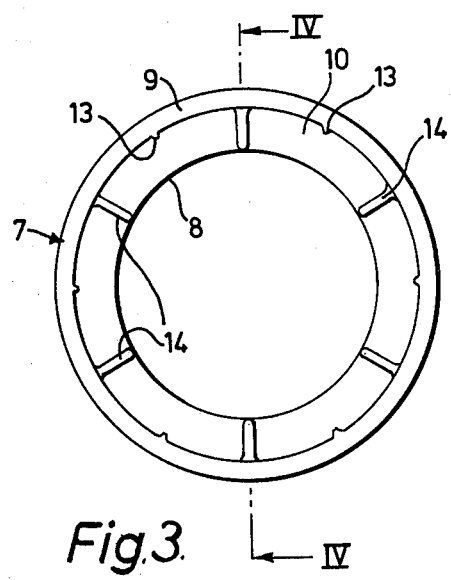
FIG. 3 is an end elevation of the closure means.
Figure 4:
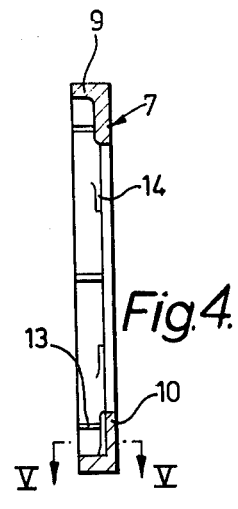
FIG. 4 is a cross-section of the closure means of FIG. 3 on the line IV — IV in FIG. 3.
Figure 5:
FIG. 5 is a cross-section of part of the closure means of FIGS. 3 and 4 on the line V — V in FIG. 4.

A housing 1 is formed with a counterbore 2 (constituting the aforesaid bore) which is coaxial with an aperture 3 housing a sleeve type pressure-lubricated bearing 4. A shaft 5 is supported for rotation in the bearing 4 and carries an annular ring 6 (defining the aforesaid annular shoulder). The inner diameter of the ring 6 is such that the ring is a tight fit on the shaft 5 and will rotate with the shaft. The ring 6 has a cylindrical outer periphery formed with a helical groove 6a which extends for at least one turn around the ring. Closure means in the form of a cup 7 is press-fitted into the end of the counterbore 2, the shaft 5 extending with working clearance through a central aperture 8 in the cup 7. The cup 7 has a cylindrical side wall 9 and an annular end wall 10, a space 11 being defined between the right-hand end of the side wall 9 and the ring 6. The side wall 9 and end wall 10 locate a ring of felt 12. The felt 12 engages the ring 6, but is restrained against rotation by means of ribs 13, 14 which project from the side and end walls 9, 10 respectively of the cup 7. The ribs 13 extend axially of the cup 7 whilst the ribs 14 extend radially thereof. As shown in FIGS. 3 and 5, the ribs 13, 14 are generally square in cross-section. A cavity 15 is defined between the ring 6 and the counterbore 2 which communicates with the interior of the housing 1 by means of a drainage duct 16.

In use, lubricant under pressure between the bearing 4 and the shaft 5 tends to escape from the ends of the bearing, some of the escaping lubricant passing into the cavity 15, and the remainder passing directly into the interior of housing 1. The lubricant moves under centrifugal force towards the cylindrical wall of the counterbore 2 and would, in the absence of the helical groove 6a, pass freely between the wall of the counterbore 2 and the periphery of the ring 6. However, the helical groove 6a is arranged so that the hand of the helix will tend to constrain lubricant towards the cavity 15 and drainage duct 16 as the shaft 5 rotates, and movement of lubricant past the ring 6 will, therefore, be resisted. As previously explained, the use of a helical groove to effect sealing is completely satisfactory only when the running clearance between the shaft and the adjacent wall of the bore is very small. In the embodiment shown, the running clearance between the counterbore 2 and the periphery of the ring 6 is chosen to cater for a relatively large running clearance in the bearing 4. Therefore, a certain amount of lubricant may overcome the resistance of the helical groove 6a. Any such lubricant passes into the space 11 between the ring 6 and the cup 7. The only way in which lubricant in the space 11 can thereafter reach the space between the shaft 5 and the aperture 8 is by creeping alongside the felt ring 12. However, it has been found that centrifugal action prevents the lubricant from creeping alongside the felt ring in this manner, and that an effective lubricant seal is produced despite the face that the running clearance between the counterbore 2 and ring 6 is relatively large. By forming the helical groove 6a on a ring having a greater diameter than the shaft 5, and by utilising a cup 7 to form a dam for the lubricant and to locate the felt ring 12, a distinct change in the direction of lubricant tending to escape from the bearing 4 is achieved. Thus, if the lubricant is to reach the space between the shaft 5 and the aperture 8, not only does it have to overcome the resistance of the helical groove 6a, it also has to overcome centrifugal action on the left-hand side of the ring 6.

Typical approximate clearances and dimensions are given by way of example as follows:

Clearance between the counterbore 2 and the periphery of ring 6: 0.07 mm all round.

Clearance between the aperture 8 and the shaft 5: 0.1 mm all round.

Diameter of the counterbore 2 is 30% to 50% greater than the diameter of the shaft 5.

Overall axial length of the cup 7 is approximately equal to the overall axial length of the ring 6 and is 10% to 15% of the diameter of the shaft 5.

The ribs 13, 14 project by a distance equal to 10% to 15% of the overall length of the cup 7.

Various materials may be used in the manufacture of the ring 6 and the cup 7 such as plastics, rubber, aluminium, zinc, steel, cast iron or brass. If desired, the annular shoulder formed by the ring 6 may be formed as an integral part of the shaft 5. The ring 12, which also serves to prevent dust or other contaminants from entering the engine or machine, could be formed from a suitable material other than felt, and could be bonded or otherwise secured to the cup 7 instead of being restrained by the ribs 13, 14.

Although the helical groove 6a had been described as being formed in the ring 6, a helical groove could alternatively or additionally be formed in the adjacent wall of the counterbore 2.

Whilst a liquid sealing device in accordance with the invention would not necessarily be effective where the lubricant is under high pressure, it has been found very effective in preventing the escape of lubricant in low pressure applications and when the lubricant is air borne or splashed on to the shaft 5.

The liquid sealing device may be used for sealing against escape of liquids other than lubricants.

What I claim as my invention and desire to secure by Letters Patent of the United States is:

1. A liquid sealing device for inhibiting passage of liquid between a rotatably mounted shaft and an aperture through which the shaft extends with working clearance, comprising an annular shoulder projecting from the shaft; means adjacent the shaft formed with a cylindrical bore in which said annular shoulder is rotatable with working clearance; a helical groove extending around the periphery of said annular shoulder; closure means for said bore adjacent one end of said annular shoulder and defining said aperture through which the shaft extends with working clearance; an annular sealing element disposed between said closure means and said one end of said annular shoulder, said sealing element engaging said closure means, a peripheral portion of said shaft and a substantial portion of said one end of said annular shoulder; restraining means on said closure means for preventing said sealing element from rotating; said helical groove being oriented such that rotation of the shaft in a given direction will cause said helical groove to resist the passage of liquid between said annular shoulder and said bore, and said one end of said annular shoulder operatively coacting with said sealing element such that centrifugal action inhibits passage between said annular shoulder and said sealing element of any residual liquid which overcomes the resistance of said helical groove.

2. A liquid sealing device, according to claim 1, in which the helical groove is formed in the periphery of the annular shoulder.

3. A liquid sealing device, according to claim 1, in which the sealing element is restrained against rotation by means of projections on said closure means.

4. A liquid sealing device, according to claim 3, in which the projections are in the form of a plurality of radially disposed ribs arranged on an annular inner surface of the closure means engageable with the sealing element.

5. A liquid sealing devie, according to claim 3, in which the projections are in the form of a plurality of circumferentially spaced ribs arranged on a cylindrical inner surface of the closure means engageable with the sealing element.

6. A liquid sealing devie, according to claim 5, in which the projections are in the form of a plurality of radially disposed ribs arranged on an annular inner surface of the closure means engageable with the sealing element.

7. A liquid sealing device, according to claim 3, in which the projections are of substantially square cross-section.

8. A liquid sealing device, according to claim 1, in which said means for restraining said sealing element against rotation is an adhesive which bonds said sealing element to the closure means.

9. A liquid sealing device, according to claim 8, in which the end of the peripheral wall of the cup-like element remote from said annular end surface is spaced from the annular shoulder.

10. A liquid sealing device, according to claim 1, in which the sealing element is a felt ring.

11. A liquid sealing device, according to claim 8 and in the case where the sealing element is restrained against rotation by means of projections on said closure means, in which the projections extend from the closure means for a distance equal to approximately 10% to 15% of the axial length of the said cup-like element.

12. A liquid sealing device, according to claim 1, in which the closure means is a cup-like element having a cylindrical peripheral wall and an annular end surface.

13. A liquid sealing device, according to claim 1, in which the dimensions of the closure means and bore are such that the closure means is a tight fit in the bore.

14. A liquid sealing device, according to claim 1, in which the axial length of the annular shoulder is approximately 10% to 15% of the shaft diameter.

15. A liquid sealing device, according to claim 11, in which the axial length of said cup-like element is approximately 10% to 15% of the shaft diameter.

16. A liquid sealing device, according to claim 1, in which the diameter of said bore is approximately 30% to 50% greater than the diameter of the shaft.

17. A liquid sealing device, according to claim 1, in which a drainage outlet is provided in the bore on the opposite side of the annular shoulder to the closure means to enable lubricant entering the bore to drain therefrom on encountering the flow resistance due to the helical groove and the co-operating annular shoulder and closure means.

18. A liquid sealing device, according to claim 1, in which the helical groove extends for one turn around the periphery of the annular shoulder.

19. A liquid sealing device, according to claim 1, in which the helical groove extends for between one and two turns around the periphery of the annular shoulder.

20. A liquid sealing device, according to claim 1, in which the annular shoulder is formed by a ring-like member fitted sealingly to the shaft.

21. A liquid sealing device, according to claim 1, in which the said means adjacent the shaft in which the bore is formed comprises support means for rotatably supporting the shaft.

* * * * *